United States Patent
Grant et al.

(10) Patent No.: US 11,521,378 B2
(45) Date of Patent: Dec. 6, 2022

(54) REFINED SEARCHING BASED ON DETECTED OBJECT CONFIGURATIONS

(71) Applicant: INTERNATIONAL BUSINESS MACHINES CORPORATION, Armonk, NY (US)

(72) Inventors: Robert Huntington Grant, Atlanta, GA (US); Ruchika Bengani, Pearland, TX (US); Shikhar Kwatra, Durham, NC (US); Zachary A. Silverstein, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 461 days.

(21) Appl. No.: 16/734,894

(22) Filed: Jan. 6, 2020

(65) Prior Publication Data

US 2021/0209331 A1    Jul. 8, 2021

(51) Int. Cl.
*G06V 20/13* (2022.01)
*G06K 9/62* (2022.01)
*G06V 10/70* (2022.01)

(52) U.S. Cl.
CPC .......... *G06V 20/13* (2022.01); *G06K 9/6263* (2013.01); *G06K 9/6284* (2013.01); *G06V 10/70* (2022.01); *G06T 2207/20084* (2013.01)

(58) Field of Classification Search
CPC .......... G06T 2207/10032; G06T 2207/30232; G06V 20/13; G06V 20/17; G06V 20/52;
(Continued)

(56) References Cited

U.S. PATENT DOCUMENTS

| 5,341,439 A | 8/1994 | Hsu |
| 6,289,331 B1 | 9/2001 | Pederson |

(Continued)

FOREIGN PATENT DOCUMENTS

| WO | 2003081533 A3 | 10/2003 |
| WO | 2018035835 A1 | 3/2018 |
| WO | 2019055690 A1 | 3/2019 |

OTHER PUBLICATIONS

Naing, Kyaw Min, et al. "Application of Deep Learning Technique in UAV's Search and Rescue Operations." Proceedings of SAI Intelligent Systems Conference. Springer, Cham, 2018. (Year: 2018).*

(Continued)

*Primary Examiner* — Amandeep Saini
*Assistant Examiner* — Raphael Schwartz
(74) *Attorney, Agent, or Firm* — Rakesh Roy; Matthew M. Hulihan; Heslin Rothenberg Farley & Mesiti PC

(57) ABSTRACT

Refined searching based on detected object configurations is provided by training a machine learning model to identify non-naturally occurring object configurations, acquiring images of an initial search area based on scanning it using a camera-equipped autonomous aerial vehicle operating in accordance with an initial automated flight plan defining the initial search area, analyzing the acquired images using the trained machine learning model and identifying that an object configuration is a non-naturally occurring object configuration, then based on identifying the non-naturally occurring object configuration, refining the initial automated flight plan to obtain a modified automated flight plan defining a different search area as compared to the initial search area, and initiating autonomous aerial scanning of the different search area in accordance with the modified automated flight plan.

17 Claims, 8 Drawing Sheets

(58) Field of Classification Search
CPC .. G06V 20/10; G06V 20/176; G06V 20/0086; G08G 5/0039; G05D 1/0088; G05D 1/106
See application file for complete search history.

(56) References Cited

U.S. PATENT DOCUMENTS

| | | | |
|---|---|---|---|
| 7,363,309 | B1 | 4/2008 | Waite et al. |
| 2017/0053169 | A1* | 2/2017 | Cuban .................. G06V 20/13 |
| 2018/0106885 | A1 | 4/2018 | Blayvas |

OTHER PUBLICATIONS

Abhishek, K., "How can I distinguish between a natural and synthetic (artificial) images?", Research Gate, retrieved on Jul. 11, 2019 from the Internet URL: <https://www.researchgate.net/post/How_can_I_distinguish_between_a_natural_and_synthetic_artificial_images>, Oct. 10, 2014, 7 pgs.

Perera, A., et al., "Human Detection and Motion Analysis from a Quadrotor UAV." IOP Conf. Ser.: Mater. Sci. Eng. 405, 012003, 2018, 12 pgs.

Martins, N., et al., "Human Detection and Classification of Landing Sites for Search and Rescue Drones." In European Symposium on Artificial Neural Networks, Computational Intelligence and Machine Learning, Bruges (Belgium), Apr. 27-29, 2016, 6 pgs.

Silva Filho, P., et al., "UAV visual autolocalizaton based on automatic landmark recognition." ISPRS Annals of the Photogrammetry, Remote Sensing and Spatial Information Sciences, vol. IV-2/W3, 2017. International Conference on Unmanned Aerial Vehicles in Geomatics, Sep. 4-7, 2017, Bonn, Germany, 6 pgs.

Waharte, S., et al., "Supporting Search and Rescue Operations with UAVs," 2010 International Conference on Emerging Security Technologies, Canterbury, 2010, pp. 142-147, 6 pgs.

Stergianos, C., "Image recognition on a UAV." Dec. 8, 2014 [Accessed May 18, 2019]. The University of Nottingham, http://blogs.nottingham.ac.uk/innovate/2014/12/08/image-recognition-on-a-uav/, 5 pgs.

Singh, S., et al. "Recognition and identification of target images using feature based retrieval in UAV missions," 2013 Fourth National Conference on Computer Vision, Pattern Recognition, Image Processing and Graphics (NCVPRIPG), Jodhpur, 2013, pp. 1-4.

Rivas, A., et al., "Detection of Cattle Using Drones and Convolutional Neural Networks." Sensors (Basel, Switzerland) vol. 18,7 2048. Jun. 27, 2018; doi:10 3390/s18072048, 15 pgs.

Doke, J., "Analysis of Search Incidents and Lost Person Behavior in Yosemite National Park." 2012, 113 pgs.

Kumar, S., et al, "Man-Made Structure Detection in Natural Images using a Causal Multiscale Random Field", The Robotics Institute, Carnegie Mellon University, 2003, 8 pgs.

Smith, P., "Drones in Search and Rescue Operations", Drove Hive, retrieved on Jul. 11, 2019 from the Internet URL: <https://dronebelow.com/2018/08/07/drones-in-search-and-rescue-operations/>, Aug. 7, 2018, 19 pgs.

St. Fleur, N., "Lost Civilizations, Found by Drones", The Atlantic, Mar. 5, 2015, 9 pgs.

Mell, Peter, et al., "The NIST Definition of Cloud Computing", NIST Special Publication 800-145, Sep. 2011, Gaithersburg, MD, 7 pgs.

* cited by examiner

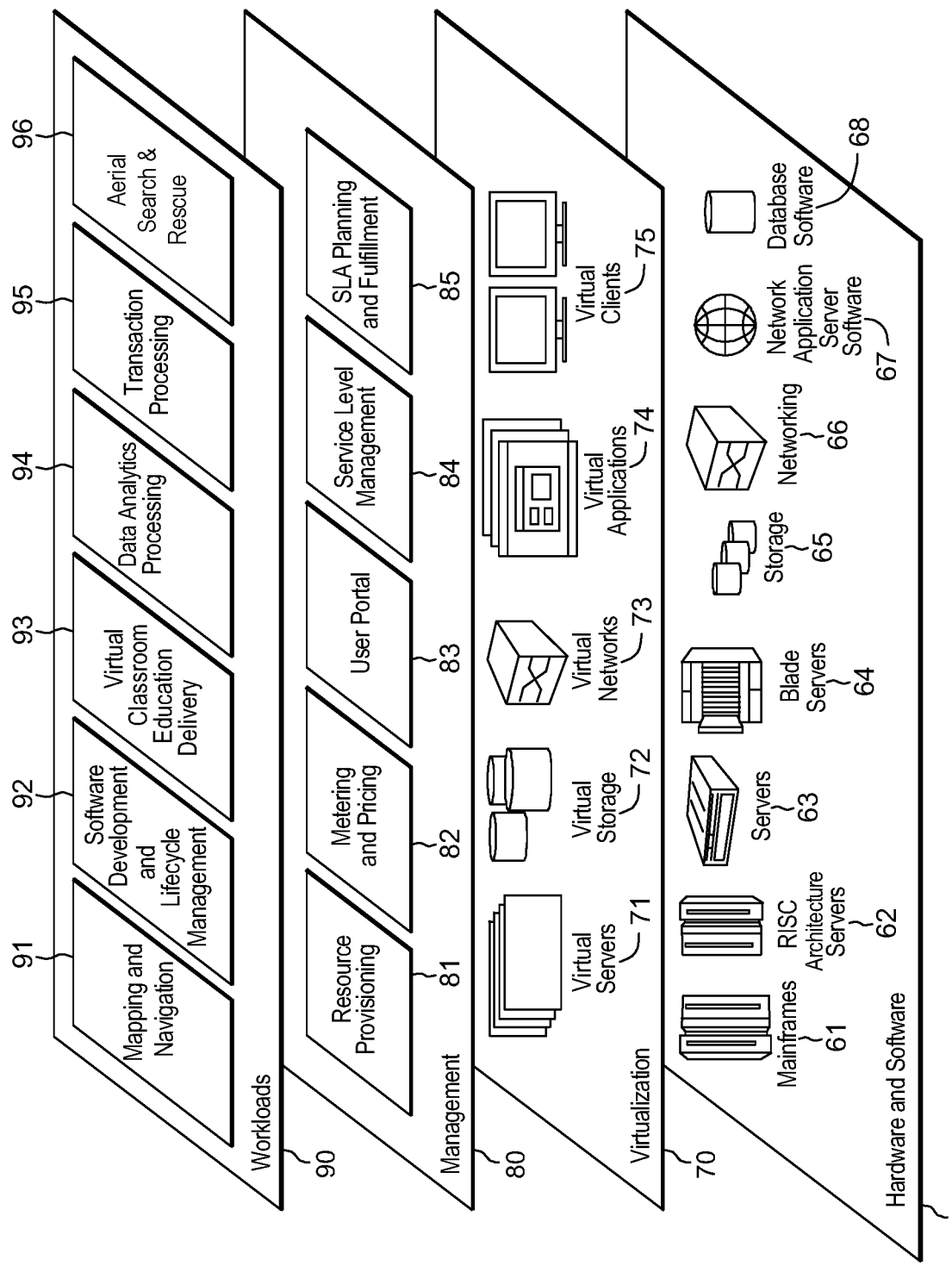

REFINED SEARCHING BASED ON DETECTED OBJECT CONFIGURATIONS

BACKGROUND

A factor in locating an individual in a geographic area, such as a large park, forest, mountain range, or the like, is setting a search area (sometimes referred to as a search grid) that guides the search for the individual. When the individual goes missing in an area, particularly a wilderness area, it is often a time-sensitive matter to locate that individual. A conventional approach is to use search and rescue foot teams to search for the individual. Some approaches use aerial crews of helicopters or other aircraft piloted by searchers, and/or uncrewed aerial vehicles (autonomous aerial vehicles, commonly referred to as unmanned aerial vehicles (UAVs) or drones) as a viewing platform for searching for the individual.

SUMMARY

Shortcomings of the prior art are overcome and additional advantages are provided through the provision of a computer-implemented method. The method trains a machine learning model. The training configures the model to identify non-naturally occurring object configurations, and the training produces a trained machine learning model. The method acquires images of an initial search area based on scanning the initial search area using a camera-equipped autonomous aerial vehicle operating in accordance with an initial automated flight plan defining the initial search area. The method analyzes the acquired images using the trained machine learning model. The analyzing identifies that an object configuration of one or more objects detected in the acquired images is a non-naturally occurring object configuration. Based on identifying the non-naturally occurring object configuration, the method refines the initial automated flight plan to obtain a modified automated flight plan defining a different search area as compared to the initial search area of the initial automated flight plan. The method also initiates autonomous aerial scanning of the different search area in accordance with the modified automated flight plan.

Further, a computer system is provided that includes a memory and a processor in communication with the memory, wherein the computer system is configured to perform a method. The method trains a machine learning model. The training configures the model to identify non-naturally occurring object configurations, and the training produces a trained machine learning model. The method acquires images of an initial search area based on scanning the initial search area using a camera-equipped autonomous aerial vehicle operating in accordance with an initial automated flight plan defining the initial search area. The method analyzes the acquired images using the trained machine learning model. The analyzing identifies that an object configuration of one or more objects detected in the acquired images is a non-naturally occurring object configuration. Based on identifying the non-naturally occurring object configuration, the method refines the initial automated flight plan to obtain a modified automated flight plan defining a different search area as compared to the initial search area of the initial automated flight plan. The method also initiates autonomous aerial scanning of the different search area in accordance with the modified automated flight plan.

Yet further, a computer program product including a computer readable storage medium readable by a processing circuit and storing instructions for execution by the processing circuit is provided for performing a method. The method trains a machine learning model. The training configures the model to identify non-naturally occurring object configurations, and the training produces a trained machine learning model. The method acquires images of an initial search area based on scanning the initial search area using a camera-equipped autonomous aerial vehicle operating in accordance with an initial automated flight plan defining the initial search area. The method analyzes the acquired images using the trained machine learning model. The analyzing identifies that an object configuration of one or more objects detected in the acquired images is a non-naturally occurring object configuration. Based on identifying the non-naturally occurring object configuration, the method refines the initial automated flight plan to obtain a modified automated flight plan defining a different search area as compared to the initial search area of the initial automated flight plan. The method also initiates autonomous aerial scanning of the different search area in accordance with the modified automated flight plan.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 8 depicts abstraction model layers according to an embodiment of the present invention.

DETAILED DESCRIPTION

Current approaches to locating an individual fail to adequately search for and discover, in an efficient manner, traces of an individual that can suggest the individual's location and potentially inform a refinement to the search area to both expedite the search and preserve the valuable resources of time and human effort. Described herein are approaches to address this, which include dynamic identification and learning of non-naturally occurring shapes, words, patterns and other object configurations that may appear in geographic areas, as well as the use of this for shifting a search area/grid being used to search for a missing individual. Aspects look for indicators that the wilderness has been distorted in a non-naturally occurring manner. Example include someone placing objects in non-naturally occurring way, leaving footprints, pushing over or cutting a tree, creating fire/smoke, clearing an area, writing a distress call in character form using natural objects, or the like. Some aspects are directed to recognizing non-naturally occurring object configurations and, if detected, alerting a user and/or modifying a search area based on that detection.

A non-naturally occurring object configuration suggests potential human activity at that location. Detecting the presence of human activity, particularly in vast geographic areas that are not frequented by humans, can be immensely helpful to the locating of a missing individual. Presented herein are methods that can use a likelihood of an anomalous shape or object occurring in nature to enter a triaging or alerting state for an autonomous aerial vehicle to manage the anomaly and/or further investigate. A variety of different approaches can be used to conclude that an object configuration is non-naturally occurring. This includes not only detecting presence of non-naturally occurring objects themselves, but also detecting an arrangement, configuration, or use of naturally occurring objects in a non-natural manner. Examples of the latter are constructing a lean-to out of tree branches, stacking of stones in a geometrically familiar pile, and arranging logs to form characters. Thus, in some examples imaged objects are identified as trees—clearly naturally-occurring objects—but it is further determined that the trees are arranged in a non-natural configuration, for instance a shape, arrangement, or pattern that is impossible or highly unlikely to have occurred without human intervention.

Figure 1:
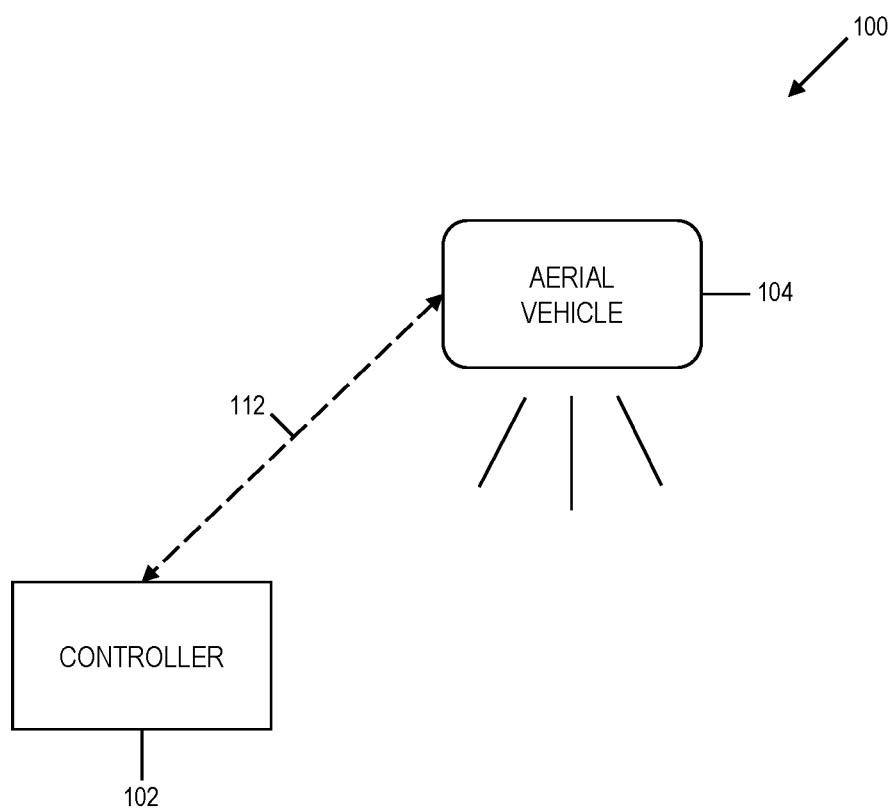
FIG. 1 depicts an example environment to incorporate and use aspects described herein.

FIG. 1 depicts an example environment to incorporate and use aspects described herein. Controller 102 communicates with aerial vehicle 104 via communications link 112 in environment 100. Aerial vehicle 104 operates autonomously or semi-autonomously in some examples. For instance, the aerial vehicle 104 is a drone or other UAV that is capable of flying over a geographic area unassisted/uncrewed. Aerial vehicle 104 operates autonomously according to an automated flight plan. The flight plan provides the information necessary for the aerial vehicle 104 to autonomously operate itself in accordance with the flight plan to image a geographic area. In this regard, the aerial vehicle 102 is equipped with camera(s) that capture images of the area below and optionally stores/transmits the images. The images can be captured and/or provided in the form of video.

The controller 102 refers to one or more computer system(s) that control and/or communicate with the aerial vehicle 104. For instance, the controller 102 could build and send the flight plan to the aerial vehicle, send commands to the aerial vehicle to command it to perform actions with respect to image capture, flight paths, departure from and return to a base, and/or provision of images captured by the aerial vehicle 104, among other actions.

The controller 102 and aerial vehicle 104 communicate with each other via communications link 112 for communicating data between the components. In some examples, the link 112 could form, be, or include wired or wireless network(s), such that the communication between the components takes place via wired or wireless communication(s) links for communicating data between the components. Such network(s) can include any one or more networks, such as one or more local area networks and/or one or more wide area networks, such as the internet. Communications link 112 can be any wired or wireless communications link, such as wired and/or cellular, Wi-Fi, or other types of wireless connections.

The environment of FIG. 1 is just one example environment to incorporate and use aspects described herein; others are possible and readily recognizable to those having ordinary skill in the art.

In one aspect, a training process trains a machine learning model to produce a trained machine learning model. The training configures the model to identify non-naturally occurring object configurations, referring to object(s) that, when considered in their surrounding context, appear to be non-naturally occurring as-is. Thus, in some examples, by 'non-naturally occurring' is meant statistically (lower than some threshold) unlikely to naturally occur within that context, absent human intervention/interaction. Example types of non-naturally occurring object configurations include, but are not limited to: an object shape, an object pattern, an object arrangement, and a character formation, that the trained machine learning model is configured to identify as being non-naturally occurring. In this manner, a system can establish a library of non-natural (and by deduction, natural) shapes/configurations through machine learning. In some examples, the machine learning is supervised machine learning.

The training could be based on imaged real-world areas to recognize object configurations. While the training could train on those imaged areas, the training trains the model to recognize object configurations in other area than those of the training images. Thus, a later search that employs the built model could be a search of a real-world area that the model was not trained-on, and perhaps that is entirely unknown to the search authority. Of course, it is possible that an area to be searched as part of a search mission could be one of the images areas used for the training, and the model could be used in that scenario too.

Some natural and non-natural shapes identified from images may be labeled as part of supervised learning. However, there may be other items that, while not corresponding to 'features' in the machine learning, are additionally relevant information. Some aspects can also involve monitoring patterns of individuals based on a previous history and/or event tracking network, in which case semi-supervised reinforcement learning could additionally or alternatively be used. This can account for non-labeled, monitored/trained patterns by way of an observance model tracking individuals' profiles and associated metadata attributes defining the individuals' known/unknown patterns. Thus, the model can be trained at least in part based on supervised machine learning in combination with attributes of individuals and/or the individual that is the subject of a search. The attributes could be predetermined/predefined, for instance the age of the individual to be located, which could inform movement patterns, speed, routes, and the like, or handwriting patterns of the individual, which could inform how a distress message that is written by the individual in sand or shaped from objects is expected to look. Additionally or alternatively, the attributes could be dynamically determined from the present search. For example, pattern and properties of movement over the past several days of the search could be ascertained. The attributes could therefore be derived from profiled patterns of the missing individual. Possible movement indicators based off of historical information and/or profile information about the user can be particularly useful, since they can be used to dictate how large or how small to narrow or expand a search radius. As noted, an automated flight plan could be refined based on identifying non-naturally occurring object configuration(s). The patterns can factor into this refining. For instance, a process could determine a commonly-taken path by hikers or other individuals passing through an area. Or the process could determine a trajectory of movement of the individual to be located from a pattern of the profiled patterns, for instance a pattern of speed and movement of the individual, and define a different search area accordingly. In some examples, the pattern suggests that the individual is likely to be at or near a specific location, and the refining zeros-in on this location. The location could be a sub-area of the initial search area, or could be an area outside of the initial search area, for instance when a pattern suggests that the user has moved to outside the initial search area.

Thus, at some point, a camera-equipped aerial vehicle is deployed over an area and begins scanning using camera technology. This acquires images of an initial search area based on scanning the initial search area using the aerial vehicle operating in accordance with an initial automated flight plan. This initial flight plan could be automatically or manually set and define the initial search area. The acquired images are analyzed using the trained machine learning model. The analyzing can identify that an object configuration, of object(s), detected in the acquired images is a non-naturally occurring object configuration. In one example, this analysis is performed directly on the aerial vehicle by a computer system thereof. Additionally or alternatively, some or all of the analysis could be performed by another computer system remote from the aerial vehicle, for instance a backend system or server. In a particular embodiment, the processing is by a controller (e.g. FIG. 1, 102) with which the aerial vehicle is in communication.

As part of the analyzing, a feature parser engine of a system can parse through captured images/video and perform real-time data extraction and mapping. The system can analyze the images/video for potential non-natural shapes according to the machine learning described above, for instance utilizing Visual Simultaneous Localization and Mapping (VSLAM) in a confined region infused with Gated Recurrent Unit-Recurrent Neural Network (GRU-RNN) for accuracy and training of individual patterns and traces. Deploying VSLAM with a Region-convolutional neural network (R-CNN) algorithm and tracker for object detection can work in conjunction to determine individual tracks and patterns to reduce the search area to an area corresponding to the location of an identified non-natural object configuration. Gated Recurrent Unit (GRU) infused with RNN can be used to achieve the goal of effectively tracking long-term dependencies while mitigating the vanishing/exploding gradient problems. Auto-encoders or PCA (principal component analysis) can be used in an assist processor in communication with the aerial vehicle in order to perform feature pruning, that is, dimensionality reduction and extracting the most relevant feature sets for accurately predicting the individual's characteristics based on inputs identified from the prior step, and refining through the iterative process over time.

By way of a specific example embodiment, example feature sets included in a semi-supervised model include:

When an object configuration is identified as being a non-naturally occurring object configuration, a confidence level or score may be associated with that identification. That is, identification of a non-naturally occurring object configuration as such may not necessarily be made with absolute certainty. However, based on an initial determination of a non-naturally occurring object configuration, for instance with a first threshold confidence, the flight plan can be refined in order to rescan a targeted area, perhaps at a closer distance or higher quality, and identify the object configuration with an increased confidence level (i.e. either with a higher level of confidence that it is non-naturally occurring, or that upon more detailed visual inspection it is in fact a naturally-occurring object configuration). Identification with a higher level of certainty can use, for example, an existing shape library and/or an alphabet/dictionary for comparison. Additionally or alternatively, it can identify specific material of the object(s) and/or a surrounding area to establish a probability as to whether the object configuration is naturally or non-naturally occurring.

By way of a specific example, the aerial vehicle (client) and a controller (server) communicate via the Message Queuing Telemetry Transport (MQTT) messaging protocol. A forward-looking infrared (FLIR) enabled heat map with a GRU neural network is embedded in an assist machine (such as controller 102). Landmarks and paths detected based on previous pattern history are used in estimated/true path error computation via the known Gradient Descent iterative machine learning algorithm to improve accuracy over time. Individuals' metadata, pattern trajectory, and/or gait analyses are used in conjunction with this, as well as the FLIR enabled heath map, in a similarity analysis to correlate known/unknown or dangerous paths observing non-naturally occurring patterns. 'Safe' paths and 'dangerous' paths can be identified. This undergoes reinforcement learning, feature pruning or enhancement via PCA analysis and error rate computation. The Density-based Spatial Clustering of Applications with Noise (DBSCAN) clustering method is used for similar frisk patterns and anomalous event occurrence, which sets a criticality threshold. The frisk patterns may initially start at a high level/speed, low granularity to detect high level indicators (rock formations, pushed down trees, etc.), and then, upon detection of anomalous events/configurations, the aerial vehicles take on a slower speed, more granular search. The criticality threshold may be pre-defined by a number of indicators such as 2 or 3 "fresh" occurrences of unusual events/configurations, or it may be ad-hoc/dynamically set or adjusted based on the severity (a user writing HELP vs an overturned tree/abnormal rock formation, for instance). This informs the ameliorative notification strategy.

Based on the above, aspects can determine that a shape is anomalous and notify users, for instance a search and rescue team, of the anomaly via linked devices. An interface can

---

-Current metrics: {"Geo-location", "time"};
-User metadata: {" Previous tracks/path" --> Maps Application Programming Interface (API), "Devices possessed" --> Identification and tracking, "clothing accessories" --> R-CNN sub-Machine Learning model, "voice feature" --> Mel-Frequency Cepstral Coefficients (MFCC) with Gaussian Mixture Model (GMM)};
  -Enhanced user attributes: {"Handwritten/verbal/unspoken patterns"};
  -Visuals payload: {"Gait Analysis" --> Movement speed, projectile, strides, trails};
    -Deviation Threshold: {"Area criticality" --> Dangerous spatial objects}; and
    -Path tracking: {"Deviation from preferential/original path" --> Computer Vision Algorithm} transfer the path and pattern trajectory of a detected anomalous event to linked device(s) (e.g. aerial vehicle, controller, other systems used by searchers, etc.) for deriving the ameliorative action strategy, which refers to some response—for instance decreasing the altitude of the aerial vehicle and reducing the size of the search area to zero-in on a detected anomaly.

Figure 2A:
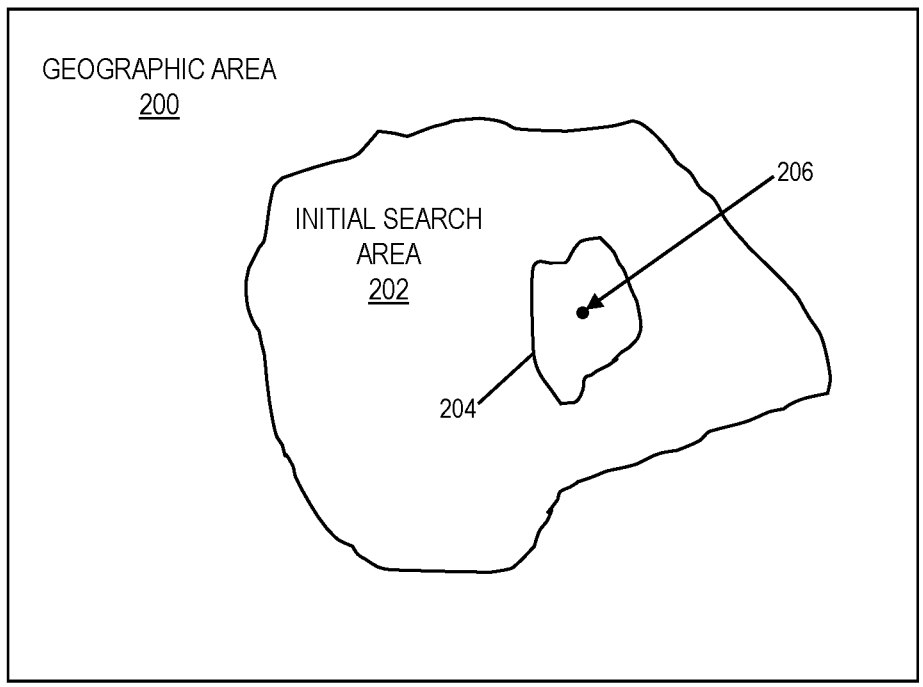
FIGS. 2A and 2B depict examples of refining a flight plan to refine an initial search area, in accordance with aspects described herein.
Figure 2B:
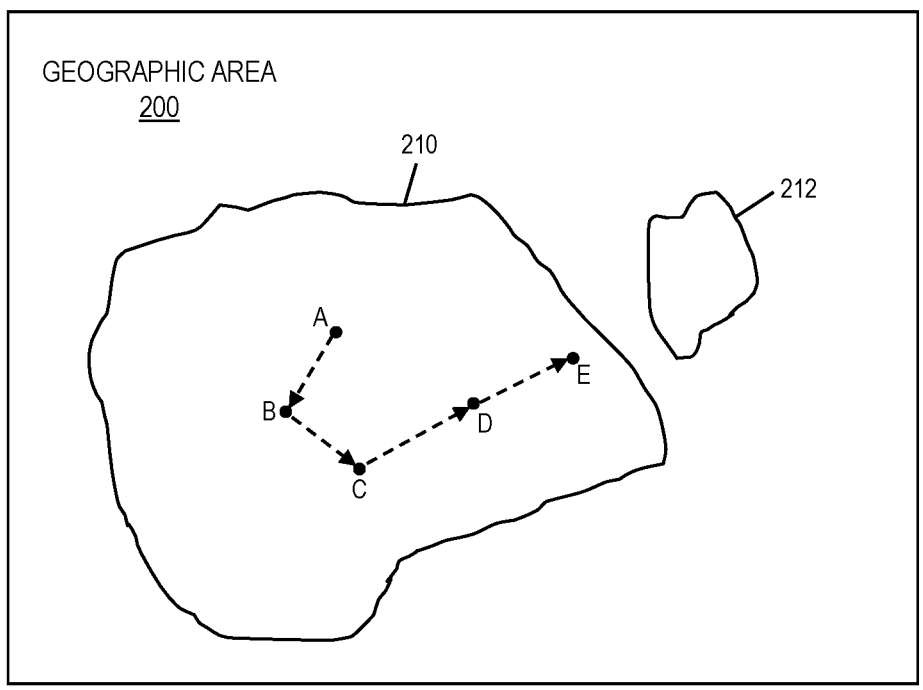

Based on identifying a non-naturally occurring object configuration, a process can refine the initial automated flight plan to obtain a modified automated flight plan that defines a different search area as compared to the initial search area of the initial automated flight plan. FIGS. 2A and 2B depict examples of refining a flight plan to refine an initial search area, in accordance with aspects described herein.

In the example of FIG. 2A, an aerial vehicle operates in accordance with an initial automated flight plan that defines an initial search area 202 within geographic area 200. Based on identifying a non-naturally occurring object configuration at location 206 within this initial search area, the flight plan is refined to focus on that particular location 206 within that initial search area. Thus, the initial flight plan is refined to provide a modified automated flight plan with a different search area. The refining focuses the different search area of the modified automated flight plan to a sub-area 204 of the initial search area. The sub-area surrounds the location 206 of the identified non-naturally occurring object configuration.

FIG. 2B depict an example where a pattern emerges in the form of a path of prior-identified non-naturally occurring object configurations. This occurs, in one embodiment, where the model is trained at least in part based on supervised machine learning in combination with attributes of a missing individual that is the subject of a search. The attributes can be derived from profiled pattern(s) of the missing individual. Here, within geographic area 200, initial search area 210 of the initial automated flight plan is refined based on observing a series of non-naturally occurring object configurations A, B, C, D, and E. A pattern is identified showing a potential trajectory of movement. In some examples it may be possible to determine that the individual has moved from A to B to C to D to E, rather than, for example, in the other direction. Some non-naturally occurring object configurations have properties from which their age can be discerned. A recently constructed lean-to will appear different than one that has been weathered for years, and a campfire that continues to burn suggests more recent human activity than one that is no longer burning, as examples. In any case, refining the initial automated flight plan can include determining a trajectory of movement of the individual from a pattern of the profiled patterns (here a pattern formed by the object configurations), and defining the different search area of the modified automated flight plan to be an area that resides at least partially outside of the initial search area of the initial automated flight plan. In FIG. 2B, the movement suggests that the individual may have traveled outside of area 210. Based on how an expected or actual speed (as observed from user attributes and/or observing the individual) at which the individual moves, the different search area is set to area 212, outside of the initial search area. The pattern of the profiled patterns in this case includes the path of prior-identified non-naturally occurring object configurations (A→B→C→D→E) identified as part of the search for the individual. The different search area is set to area 212 that is projected from that path and is predicted to contain the individual and/or another non-naturally occurring object configuration to append to the path. Based on refining the flight plan, the process can then initiate autonomous aerial scanning of the different search area in accordance with the modified automated flight plan.

As noted previously, an initial identification of a non-naturally occurring object configuration identifies it as being non-naturally occurring with a first confidence level. In order to be more confident in the identification, the flight plan can be refined for instance as in FIGS. 2A and 2B. The aerial vehicle can perform an updated scan at a lower altitude, higher imaging quality, and/or at a slower rate, as examples, to provide more detailed source images for another analysis and assessment.

This can be an iterative process of refining the flight plan—repeating the acquisition of the images and the analyzing those acquired images for the different search area of the modified search plan, in which images of the different search area are acquired and analyzed using the trained machine learning model, to further identify the non-naturally occurring object configuration and/or identify other non-natural object configuration(s) or the individual. This repeating can identify, with a second confidence level higher than the first confidence level, that the non-naturally occurring object configuration initially identified is non-naturally occurring. In particular examples, the repeating recognizes a character formation that forms a distress call from objects of the identified non-naturally occurring object configuration.

Figure 3:
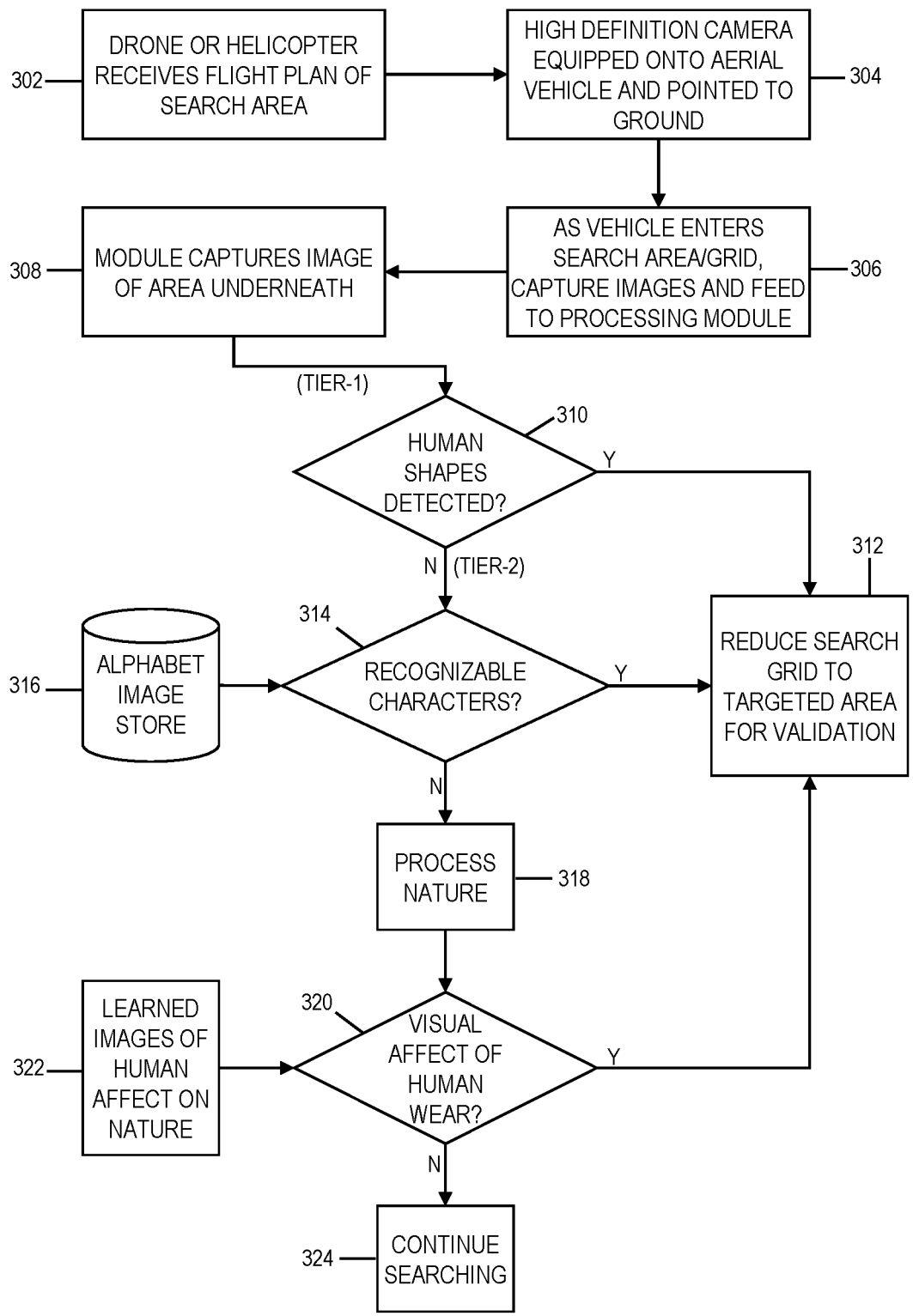
FIG. 3 depicts an example search process in accordance with aspects described herein.

FIG. 3 depicts an example search process in accordance with aspects described herein. The aerial vehicle receives (302) an initial flight plan of the search area. The aerial vehicle is equipped (304) with a high-definition camera that is directed toward the area below the aerial vehicle so that images the ground below. As the aerial vehicle enters the search area, it captures (306) images and feeds them into a processing module, for instance a processing module the aerial vehicle itself or a remotely located processing module, such as controller 102. This capture and feeding may be a continual process.

The process module captures (308) the images of the area underneath the aerial vehicle and invokes a first-tier search, which in this example is a determination (310) of whether there are human shape(s) detected. This is done to recognize the presence of human(s) in the search area. If human shape(s) are detected (310, Y), the process reduces (312) the search grid to a targeted area (where the human shape(s) were detected) for validation. Validation in this context refers to validating whether what was initially observed as human shape(s) is in fact one or more humans. At any point search personnel can be notified as to occurrences with respect to this processing.

If this initial attempt to identify a human in the acquired images is unsuccessful, the trained machine learning model can be leveraged to identify non-naturally occurring object configuration(s) that may be present. Thus, if at 310 is it determined that no human shapes have yet been detected (310, N), a tier-two search determines (314) whether there are any recognizable characters (letters, numbers, etc.). An alphabet image store 316 stores images or other representations of shapes corresponding to alphabetic characters or symbols for one or more languages, and this is used in determining whether there are any recognizable characters in the acquired images. If so, (314, Y) the process continues to 312 to reduce the search grid to a targeted area for validating what was initially identified as characters.

Otherwise (314, N), the process continues by processing (318) the nature represented in the images to detect any abnormal 'wilderness' appearing therein. This is seeking to detect any other non-naturally occurring objects, for instance shapes (near-perfect circles or triangles) or objects that are not typically found in the wilderness in the form depicted in the images. The process determines (320) whether there is any visual affect of human wear/activity. This leverages machine-learned images of human affect on nature (322) to identify whether any such affect(s) are observed in the acquired images. Generally, the objective is to identify materials, objects, shapes, words, patterns and any other configurations to understand whether they do not naturally occur as presented in the images. As another example, logs from multiple downed trees are unlikely to wash on shore in a pattern that resembles mud streaks left by a low tide.

If there is any visual affect of human wear (320, Y), the process continues to 312 where it reduces the search grid and continues with the searching (return to 308). The iterating can use multiple different levels of confidence thresholds to refine/reduce for closer examination. For instance, initially a low level of threshold is used for initial pattern/object configuration recognition—that is, it is relatively easier to satisfy the threshold for identifying something that appears non naturally-occurring. After refining the search area, for instance to fly the aerial vehicle closer to an initial object configuration and reduce the size of the search area, a higher level of certainty is needed (corresponding to a higher threshold) for the recognition/identification of non-naturally occurring objects and notification of users such as the search and rescue team.

An example use case to illustrate some aspects described herein is as follows:

1. Z is lost in a wooded area of a national park. 2. Z decides to build an object configuration in an open field into which he stumbles, the object configuration being an outlying of the characters "H L P" using logs that Z found. 2. A search and rescue team uses a drone, equipped with camera(s) and a system to perform processes described herein, to fly over the national park and image the ground beneath it. 4. The drone scans several acres of the initial search area and identifies the object configuration in the form of the "H L P" shape. As one example, the identification is done by identifying the multiple right angles formed by the logs. This is an arrangement that is not naturally occurring.

Figure 4:
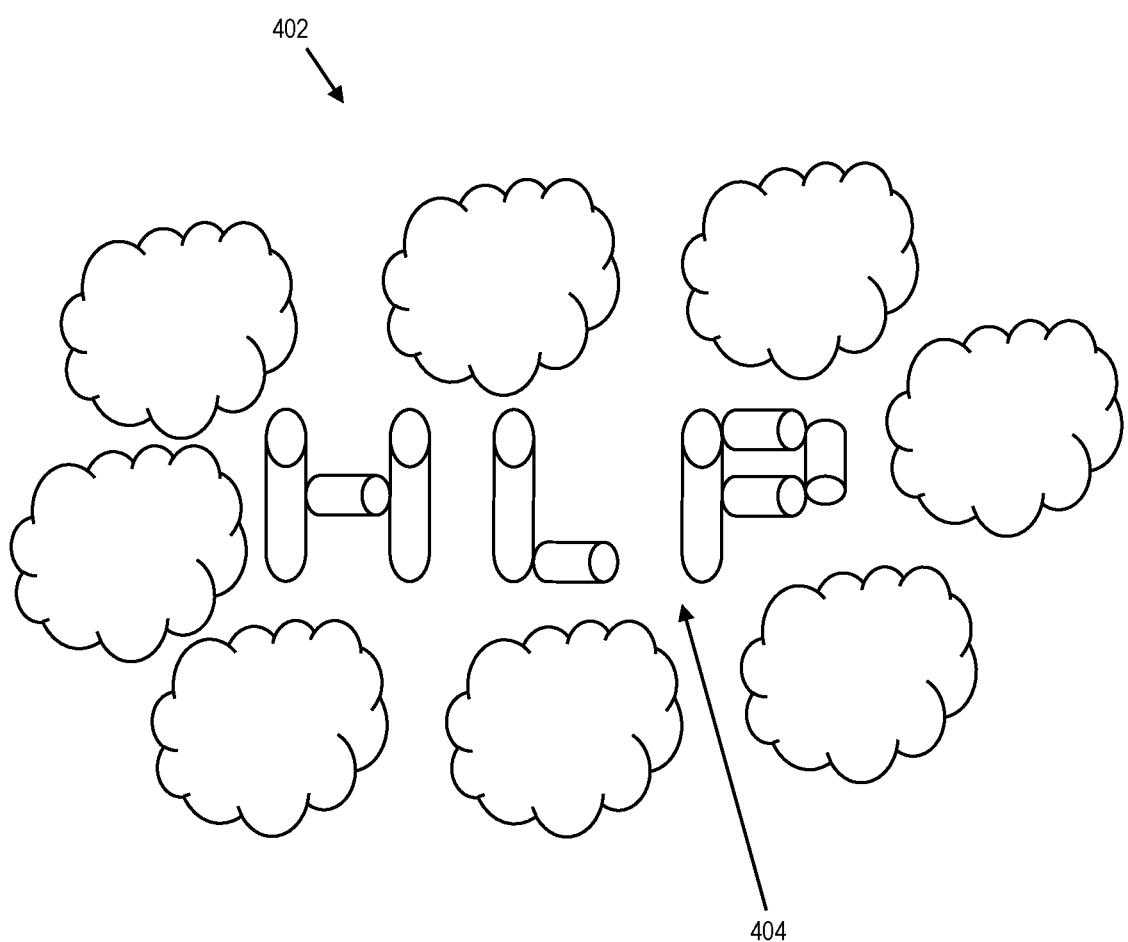
FIG. 4 depicts an example of a non-naturally occurring object configuration, in particular a character formation, in accordance with aspects described herein.

FIG. 4 depicts an example of a non-naturally occurring object configuration, in particular a character formation, in accordance with aspects described herein. The search area includes a wooded area 402. The object configuration 404 is the formation of the "H L P" characters.

Continuing with the example use case, 5. The analyzing analyzes the right angles to identify that these appear to be non-naturally occurring; it determines there is a very low likelihood the multiple right angles of the object configuration were formed naturally. 6. The drone refines the search grid, re-images 402 or 404 to investigate further, and determines, e.g. with a high probability, that "H L P" is not naturally occurring and was likely associated with spelling the distress call "HELP". 7. Based on monitoring Z's tracks and previous pattern history of geofences covered, path trajectory, or the like, the drone understands the movement trail and traces of Z's pattern. In this regard, identification of non-naturally occurring object configuration(s) forms a trail that can inform where Z is at present. 8. The drone alerts a search crew to the anomaly and/or continues to search. In this regard, the searching may return to the 'initial' scope, perhaps at a higher altitude, in which the threshold for detection is again lowered until an object configuration of interest is found and explored via another refined flight plan.

Aspects described herein therefore incorporate a cognitive component that can understand unnatural changes, occurrences, configurations in the environment based on detected objects in the images, and refine a flight plan accordingly. In particular embodiments, a model used by an aerial vehicle is trained with natural and non-natural tracks/paths in the geo-spatial environment to assist searchers along a corrective path and track objects/human patterns at various locations under a given contextual situation an in an optimized fashion. The aerial vehicle can take action including reducing a search area to an area corresponding to a location of an identified non-natural shape or object pattern.

Figure 5:
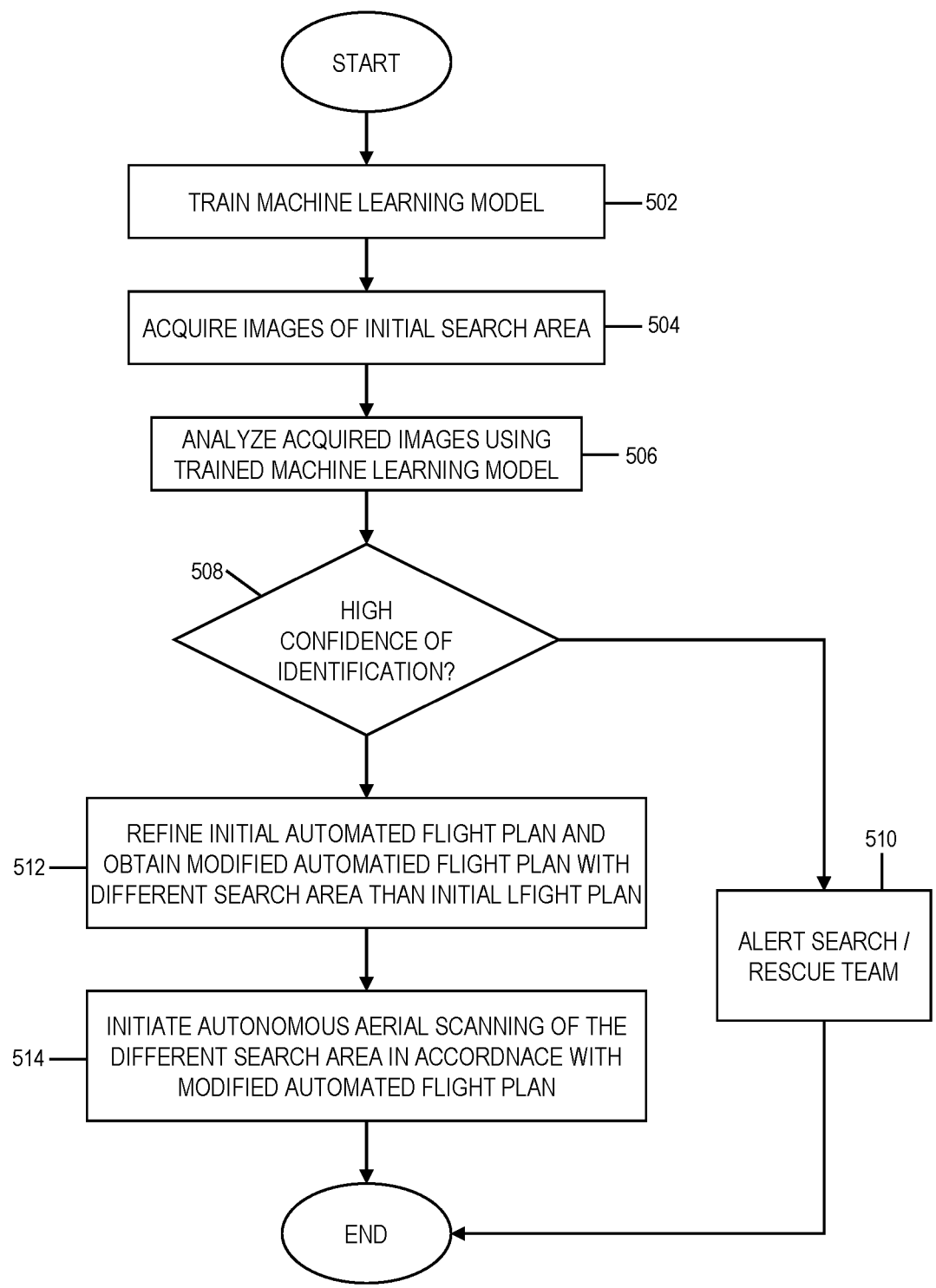
FIG. 5 depicts an example process of refined searching based on detected object configurations, in accordance with aspects described herein.

FIG. 5 depicts an example process of refined searching based on detected object configurations, in accordance with aspects described herein. In some examples, the process is performed by one or more computer systems, such as those described herein, which may include one or more computer systems of or in communication with an aerial vehicle, and/or one or more other computer systems.

The process begins by training (502) a machine learning model. The training configures the model to identify non-naturally occurring object configurations and produces a trained machine learning model. A non-naturally occurring object configuration can refer to object(s) that, when considered in their surrounding context, appear to be non-naturally occurring as is. For example, the trained machine learning model is configured to identify non-naturally occurring object configurations that include non-naturally occurring object shapes, object patterns, object arrangements, and character formations.

The process continues by acquiring (504) images of an initial search area based on scanning the initial search area using a camera-equipped autonomous aerial vehicle operating in accordance with an initial automated flight plan defining the initial search area. The process analyzes (506) the acquired images using the trained machine learning model. This analysis can be performed on-the-fly as the aerial vehicle continues to scan the initial search area and acquire additional images mid-flight. Additionally or alternatively, this could be performed after the aerial vehicle returns from imaging the search area, if desired.

The analyzing identifies that an object configuration of one or more objects detected in the acquired images is a non-naturally occurring object configuration. As noted, the identified non-naturally occurring object configuration could be (i) an object shape, (ii) an object pattern, (iii) an object arrangement, and/or (iv) a character formation, that the trained machine learning model is configured to identify as being non-naturally occurring. The identifying can identify the non-naturally occurring object configuration as being non-naturally occurring with a first confidence level. The process determines (508) whether such identification is made with high confidence. As an example, it determines whether the confidence level exceeds a threshold confidence level. Additionally or alternatively, if the detected configuration is a character or word formation understood to be a distress call, then this could inherently represent a high-confidence in the identification. If there is a high-confidence of identification of the non-naturally occurring object configuration, the process proceeds by alerting (510) the search and rescue team and ending. At that point, the search/rescue team could assess the images to confirm that it is a non-naturally occurring object configuration and respond in an appropriate matter, such as to ignore the object if determined not to be useful, send one or more resources (people, aid, etc.) to the location, command the aerial vehicle to operate according to a refined or other flight plan, for instance to continue to refine the search area to provide an even higher confidence as to the nature of the object configuration, or any other desired action.

Returning to 508, if the object configuration has been identified as non-naturally occurring but it is determined not to be a high enough confidence of identification of the object configuration as being non-naturally occurring (508, N), the process refines (512) the initial automated flight plan to obtain a modified automated flight plan defining a different search area as compared to the initial search area of the initial automated flight plan. The refining could focus the different search area of the modified automated flight plan to be a sub-area of the initial search area of the initial automated flight plan, as in FIG. 2A. The sub-area is an area surrounding a location of the identified non-naturally occurring object configuration.

In some examples, the model is trained at least in part based on supervised machine learning in combination with attributes of a missing individual that is the subject of a search, the attributes derived from profiled patterns of the missing individual, such as movement patterns and speed, handwriting patterns, or the like. The attributes could be predetermined/predefined (for instance age of the person) or dynamically determined from the present search—for instance by observing a pattern in the individual's movement over the past n number of days. Refining the initial automated flight plan can therefore include determining a trajectory of movement, of the individual, from a pattern of the profiled patterns, and setting the different search area of the modified automated flight plan to be an area residing at least partially outside of the search area of the initial automated flight plan, as in FIG. 2B. The pattern of the profiled patterns could, for instance, include a path of prior-identified non-naturally occurring object configurations identified as part of the search for the individual, and the different search area can be set to an area that is projected from that path and that is predicted to contain the individual and/or another non-naturally occurring object configuration.

The process of FIG. 5 continues after refining the initial automated flight plan (at 512) by initiating (514) autonomous aerial scanning of the different search area in accordance with the modified automated flight plan. The process ends at that point, but it is understood that the process could loop, e.g. back to 504, where images from the refined search are acquired and analyzed. In this regard, refining the initial search could be made in an attempt to more confidently determine what a discovered object configuration is, in which case the process repeats the acquiring images and the analyzing the acquired images for the different search area, in which images of the different search area are acquired and analyzed using the trained machine learning model, to further identify the non-naturally occurring object configuration. The repeating can identify, with a second confidence level higher than the first confidence level, that the non-naturally occurring object configuration is non-naturally occurring.

At some point in this processing, the object configuration could be recognized as a character formation that forms a distress call, which can be regarded as a high-confidence of identification of a very pertinent non-naturally occurring object configuration. The process could proceed from 508 to 510 in this case.

In some examples, the analyzing 506 initially attempts to identify a human in the acquired images. If a human is identified, the process could proceed immediately to 510. Based on failing to identify a human in the acquired images, then the analyzing could employ the trained machine learning model to identify any non-naturally occurring object configuration.

Although various examples are provided, variations are possible without departing from a spirit of the claimed aspects.

Figure 6:
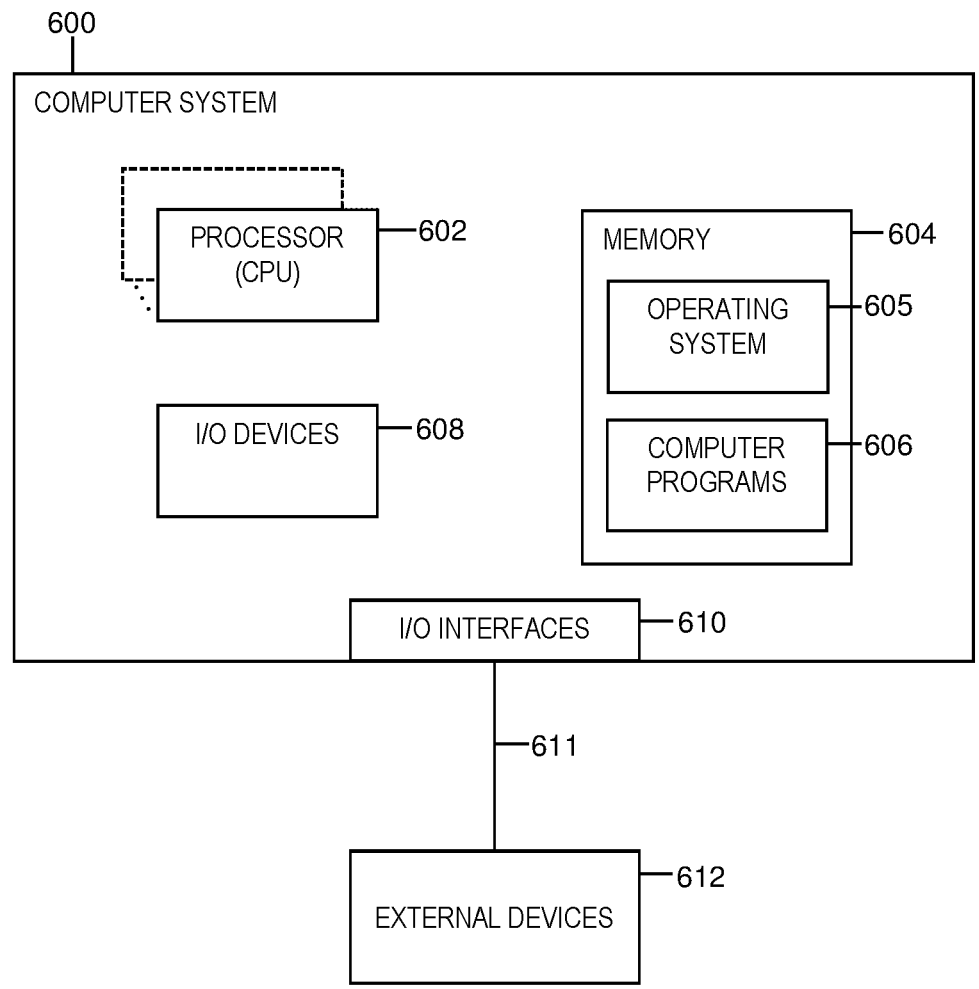
FIG. 6 depicts one example of a computer system and associated devices to incorporate and/or use aspects described herein.

Processes described herein may be performed singly or collectively by one or more computer systems, such as one or more such systems incorporated into an aerial vehicle, one or more computers other computer systems, or a combination of the foregoing, as examples. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS)

devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
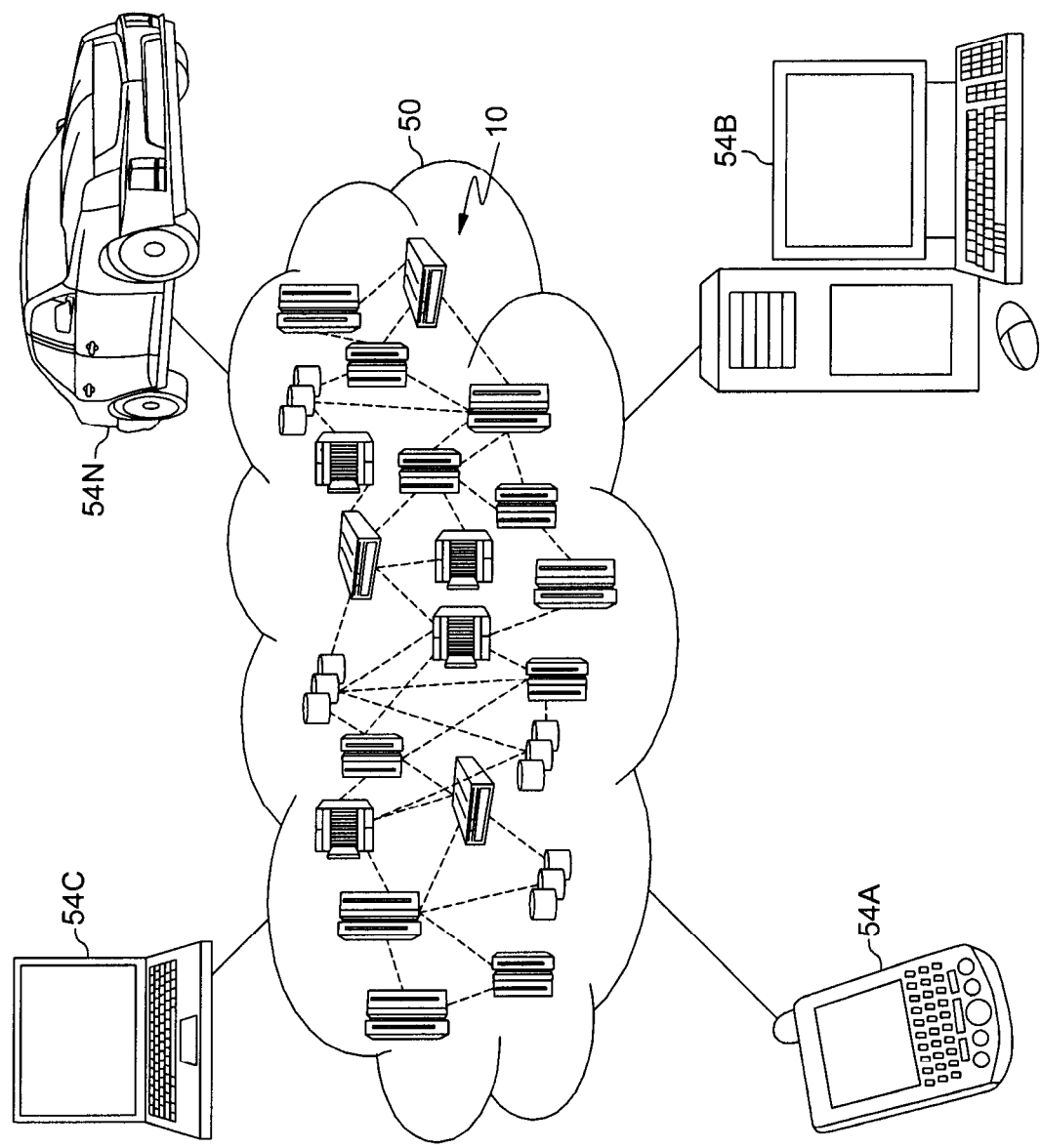
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and aerial search and rescue 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   training a machine learning model, the training configuring the model to identify non-naturally occurring object configurations, the training producing a trained machine learning model;
   acquiring images of an initial search area based on scanning the initial search area using a camera-equipped autonomous aerial vehicle operating in accordance with an initial automated flight plan defining the initial search area;
   analyzing the acquired images using the trained machine learning model, the analyzing identifying that an object configuration of one or more objects detected in the acquired images is a non-naturally occurring object configuration;
   based on identifying the non-naturally occurring object configuration, refining the initial automated flight plan to obtain a modified automated flight plan defining a different search area as compared to the initial search area of the initial automated flight plan; and
   initiating autonomous aerial scanning of the different search area in accordance with the modified automated flight plan, wherein the model is trained at least in part based on supervised machine learning in combination with attributes of a missing individual that is the subject of a search, the attributes derived from profiled patterns of the missing individual, wherein refining the initial automated flight plan comprises determining a trajectory of movement, of the individual, from a pattern of the profiled patterns, and defining the different search area of the modified automated flight plan to be an area residing at least partially outside of the initial search area of the initial automated flight plan.

2. The method of claim 1, wherein the identified non-naturally occurring object configuration is at least one selected from the group consisting of: (i) an object shape, (ii) an object pattern, (iii) an object arrangement, and (iv) a character formation, that the trained machine learning model is configured to identify as being non-naturally occurring.

3. The method of claim 1, wherein the identifying identifies the non-naturally occurring object configuration as being non-naturally occurring with a first confidence level, and wherein the method further comprises repeating the acquiring images and the analyzing the acquired images for the different search area, in which images of the different search area are acquired and analyzed using the trained machine learning model, to further identify the non-naturally occurring object configuration.

4. The method of claim 3, wherein the repeating identifies, with a second confidence level higher than the first confidence level, that the non-naturally occurring object configuration is non-naturally occurring.

5. The method of claim 3, wherein the repeating recognizes a character formation forming a distress call from the one or more objects of the identified non-naturally occurring object configuration.

6. The method of claim 1, wherein the analyzing further comprises initially attempting to identify a human in the acquired images, and, based on failing to identify a human in the acquired images, using the trained machine learning model to identify the non-naturally occurring object configuration.

7. The method of claim 1, wherein the refining focuses the different search area of the modified automated flight plan to a sub-area of the initial search area of the initial automated flight plan, the sub-area being an area surrounding a location of the identified non-naturally occurring object configuration.

8. The method of claim 1, wherein the pattern of the profiled patterns comprises a path of prior-identified non-naturally occurring object configurations identified as part of the search for the individual, and wherein the different search area is set to an area that is projected from that path and that is predicted to contain at least one selected from the group consisting of: (i) the individual, and (ii) another non-naturally occurring object configuration.

9. The method of claim 1, further comprising, based on identifying the non-naturally occurring object configuration as being non-naturally occurring with a threshold confidence level, alerting a search and rescue team.

10. A computer system comprising:
    a memory; and
    a processor in communication with the memory, wherein the computer system is configured to perform a method comprising:
      training a machine learning model, the training configuring the model to identify non-naturally occurring object configurations, the training producing a trained machine learning model;
      acquiring images of an initial search area based on scanning the initial search area using a camera-equipped autonomous aerial vehicle operating in accordance with an initial automated flight plan defining the initial search area;
      analyzing the acquired images using the trained machine learning model, the analyzing identifying that an object configuration of one or more objects detected in the acquired images is a non-naturally occurring object configuration;
      based on identifying the non-naturally occurring object configuration, refining the initial automated flight plan to obtain a modified automated flight plan defining a different search area as compared to the initial search area of the initial automated flight plan; and initiating autonomous aerial scanning of the different search area in accordance with the modified automated flight plan, wherein the model is trained at least in part based on supervised machine learning in combination with attributes of a missing individual that is the subject of a search, the attributes derived from profiled patterns of the missing individual, wherein refining the initial automated flight plan comprised determining a trajectory of movement, of the individual, from a pattern of the profiled patterns, and defining the different search area of the modified automated flight plan to be an area residing at least partially outside of the initial search area of the initial automated flight plan.

11. The computer system of claim 10, wherein the identified non-naturally occurring object configuration is at least one selected from the group consisting of: (i) an object shape, (ii) an object pattern, (iii) an object arrangement, and (iv) a character formation, that the trained machine learning model is configured to identify as being non-naturally occurring.

12. The computer system of claim 10, wherein the identifying identifies the non-naturally occurring object configuration as being non-naturally occurring with a first confidence level, and wherein the method further comprises repeating the acquiring images and the analyzing the acquired images for the different search area, in which images of the different search area are acquired and analyzed using the trained machine learning model, to further identify the non-naturally occurring object configuration.

13. The computer system of claim 12, wherein the repeating comprises at least one selected from the group consisting of:
identifying, with a second confidence level higher than the first confidence level, that the non-naturally occurring object configuration is non-naturally occurring; and
recognizing a character formation forming a distress call from the one or more objects of the identified non-naturally occurring object configuration.

14. The computer system of claim 10, wherein the pattern of the profiled patterns comprises a path of prior-identified non-naturally occurring object configurations identified as part of the search for the individual, and wherein the different search area is set to an area that is projected from that path and that is predicted to contain at least one selected from the group consisting of: (i) the individual, and (ii) another non-naturally occurring object configuration.

15. A computer program product comprising:
a computer readable storage medium readable by a processing circuit and storing instructions for execution by the processing circuit for performing a method comprising:
training a machine learning model, the training configuring the model to identify non-naturally occurring object configurations, the training producing a trained machine learning model;
acquiring images of an initial search area based on scanning the initial search area using a camera-equipped autonomous aerial vehicle operating in accordance with an initial automated flight plan defining the initial search area;
analyzing the acquired images using the trained machine learning model, the analyzing identifying that an object configuration of one or more objects detected in the acquired images is a non-naturally occurring object configuration;
based on identifying the non-naturally occurring object configuration, refining the initial automated flight plan to obtain a modified automated flight plan defining a different search area as compared to the initial search area of the initial automated flight plan; and
initiating autonomous aerial scanning of the different search area in accordance with the modified automated flight plan, wherein the model is trained at least in part based on supervised machine learning in combination with attributes of a missing individual that is the subject of a search, the attributes derived from profiled patterns of the missing individual, wherein refining the initial automated flight plan comprises determining a trajectory of movement, of the individual, from a pattern of the profiled patterns, and defining the different search area of the modified automated flight plan to be an area residing at least partially outside of the initial search area of the initial automated flight plan.

16. The computer program product of claim 15, wherein the identifying identifies the non-naturally occurring object configuration as being non-naturally occurring with a first confidence level, wherein the method further comprises repeating the acquiring images and the analyzing the acquired images for the different search area, in which images of the different search area are acquired and analyzed using the trained machine learning model, to further identify the non-naturally occurring object configuration, and wherein the repeating comprises at least one selected from the group consisting of:
identifying, with a second confidence level higher than the first confidence level, that the non-naturally occurring object configuration is non-naturally occurring; and
recognizing a character formation forming a distress call from the one or more objects of the identified non-naturally occurring object configuration.

17. The computer program product of claim 15, wherein the pattern of the profiled patterns comprises a path of prior-identified non-naturally occurring object configurations identified as part of the search for the individual, and wherein the different search area is set to an area that is projected from that path and that is predicted to contain at least one selected from the group consisting of: (i) the individual, and (ii) another non-naturally occurring object configuration.

* * * * *